United States Patent
Kawamura et al.

(10) Patent No.: US 10,256,469 B2
(45) Date of Patent: Apr. 9, 2019

(54) NONAQUEOUS-ELECTROLYTE SECONDARY BATTERY AND METHOD FOR MANUFACTURING NONAQUEOUS-ELECTROLYTE SECONDARY BATTERY

(71) Applicant: SANYO ELECTRIC CO., LTD., Daito-shi, Osaka (JP)

(72) Inventors: Atsushi Kawamura, Hyogo (JP); Kazuhiro Hasegawa, Hyogo (JP); Sho Tsuruta, Hyogo (JP); Atsushi Fukui, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 157 days.

(21) Appl. No.: 15/113,896

(22) PCT Filed: Jan. 20, 2015

(86) PCT No.: PCT/JP2015/000208
§ 371 (c)(1),
(2) Date: Jul. 25, 2016

(87) PCT Pub. No.: WO2015/115052
PCT Pub. Date: Aug. 6, 2015

(65) Prior Publication Data
US 2016/0351905 A1    Dec. 1, 2016

(30) Foreign Application Priority Data

Jan. 31, 2014  (JP) .................................. 2014-016559

(51) Int. Cl.
*H01M 4/131*  (2010.01)
*H01M 4/525*  (2010.01)
(Continued)

(52) U.S. Cl.
CPC .............. *H01M 4/62* (2013.01); *H01M 4/131* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS

| | | | |
|---|---|---|---|
| 2006/0177739 A1* | 8/2006 | Endo .................... | H01M 4/485 429/231.95 |
| 2010/0227220 A1* | 9/2010 | Thackeray ............ | H01M 4/131 429/221 |

(Continued)

FOREIGN PATENT DOCUMENTS

| JP | 2003-68302 A   |   | 3/2003 |
|----|----------------|---|--------|
| JP | 2003068302 A   | * | 3/2003 |

(Continued)

OTHER PUBLICATIONS

BBC Periodic table NPL (Year: 2012).*

(Continued)

*Primary Examiner* — Ula C Ruddock
*Assistant Examiner* — Anna Korovina
(74) *Attorney, Agent, or Firm* — Westerman, Hattori, Daniels & Adrian, LLP (57) ABSTRACT

A high-capacity nonaqueous electrolyte secondary battery having good load characteristics is provided. The nonaqueous electrolyte secondary battery includes a positive electrode containing a positive electrode active material, a negative electrode, and a nonaqueous electrolyte. The positive electrode contains the active material composed of a lithium transition metal oxide and a positive electrode additive composed of an oxide that contains Li and at least (Continued)

two elements other than Li and oxygen and has an antifluorite structure. The nonaqueous electrolyte secondary battery obtained is charged until the potential of the positive electrode is 4.0 V or higher and 4.65 V or lower (vs. $Li/Li^+$).

8 Claims, 1 Drawing Sheet

(51) Int. Cl.
    H01M 4/133    (2010.01)
    H01M 4/134    (2010.01)
    H01M 4/48     (2010.01)
    H01M 4/583    (2010.01)
    H01M 10/0525  (2010.01)
    H01M 4/62     (2006.01)
    H01M 4/505    (2010.01)
    H01M 4/36     (2006.01)
    H01M 4/38     (2006.01)
    H01M 10/0587  (2010.01)
    H01M 4/587    (2010.01)
    H01M 10/052   (2010.01)
    H01M 4/02     (2006.01)

(52) U.S. Cl.
    CPC ......... *H01M 4/362* (2013.01); *H01M 4/386* (2013.01); *H01M 4/483* (2013.01); *H01M 4/505* (2013.01); *H01M 4/525* (2013.01); *H01M 4/583* (2013.01); *H01M 10/0525* (2013.01); *H01M 10/0587* (2013.01); *H01M 4/587* (2013.01); *H01M 10/052* (2013.01); *H01M 2004/027* (2013.01); *H01M 2004/028* (2013.01)

(56) References Cited

U.S. PATENT DOCUMENTS

| 2013/0171524 A1* | 7/2013 | Cho ................. H01M 4/485 |
|---|---|---|
| | | 429/221 |
| 2013/0302689 A1 | 11/2013 | Jito et al. |
| 2014/0017527 A1 | 1/2014 | Yu |
| 2015/0372304 A1 | 12/2015 | Hasegawa et al. |

FOREIGN PATENT DOCUMENTS

| JP | 3685109 B2 | 8/2005 |
|---|---|---|
| JP | 2007-287446 A | 11/2007 |
| JP | 2010-244945 A | 10/2010 |
| WO | 2012/086277 A1 | 6/2012 |
| WO | 2012/147507 A1 | 11/2012 |
| WO | 2012/165212 A1 | 12/2012 |
| WO | 2014/118834 A1 | 8/2014 |

OTHER PUBLICATIONS

Johnson et al., L"i2O Removal from Li5FeO4: A Cathode Precursor for Lithium-Ion Batteries", Chem. Mater. 2010, 22, 1263-1270, DOI:10.1021/cm902713m (Year: 2010).*
Yamaki JP2003068302 Machine translation (Year: 2003).*
Ogawa JP2007287446 Machine Translation (Year: 2007).*
International Search Report dated Mar. 10, 2015, issued in counterpart International Application No. PCT/JP2015/000208 (2 pages).

* cited by examiner

NONAQUEOUS-ELECTROLYTE SECONDARY BATTERY AND METHOD FOR MANUFACTURING NONAQUEOUS-ELECTROLYTE SECONDARY BATTERY

TECHNICAL FIELD

The present invention relates to a nonaqueous electrolyte secondary battery including a positive electrode containing a positive electrode active material composed of a lithium transition metal oxide, a negative electrode, and a nonaqueous electrolyte and to a method for manufacturing the nonaqueous electrolyte secondary battery.

BACKGROUND ART

In recent years, portable electrical devices are being greatly reduced in size and weight, and their power consumption is also increasing with increase in their functionality. Therefore, there is an increasing need for the nonaqueous electrolyte secondary batteries used as power sources to be reduced in weight and increased in capacity.

To increase the energy density of the nonaqueous electrolyte secondary batteries, it is necessary that one or both of the positive and negative electrode materials used have high energy density. In PTL 1 below, a plurality of oxides containing lithium and having the antifluorite structure are studied as positive electrode active materials.

PTL 1 proposes that an oxide containing at least two cationic elements in addition to lithium is used as the oxide having the antifluorite structure to thereby stabilize the crystal structure of the positive electrode active material. However, in PTL 1, since the oxide having the antifluorite structure is used as the positive electrode active material, it is assumed that the positive electrode active material is used at a positive electrode potential of less than 4.0 V (vs. Li/Li$^+$) at which the oxide having the antifluorite structure is not decomposed. At such a positive electrode potential, the oxide having the antifluorite structure is not decomposed, and therefore the stability of decomposition residues is unknown. Since the oxide having the antifluorite structure is strongly basic, a problem may arise in that the oxide causes generation of gas unless the oxide is sufficiently reacted and decomposed.

Metals such as Si and Sn that are alloyed with lithium are studied as negative electrode materials. For example, a Si-based material has a theoretical capacity higher by a factor of 10 or more than those of existing graphite negative electrode materials. However, a problem with such a Si-based material is that, when it is used as a negative electrode material, its irreversible capacity, which is the amount of non-dischargeable capacity after a charge-discharge cycle, may be large, so that the above advantage cannot be utilized.

PTL 2 below proposes a technique for improving the irreversible capacity of such a Si-based negative electrode material. Specifically, an oxide having the antifluorite structure is mixed into the positive electrode active material to obtain a sufficiently high charge capacity to thereby compensate for the irreversible capacity of the negative electrode material, so that a high-energy density battery can be provided.

One known example of the oxide having the antifluorite structure is Li$_5$FeO$_4$. In a battery using Li$_5$FeO$_4$ as an additive for the positive electrode, when lithium is extracted from the Li$_5$FeO$_4$ during charging, not only the valence of the transition metal in its structure changes, but also the structure is decomposed and oxygen is released. In this case, lithium can be further extracted, so that the amount of lithium usable for charging and discharging in the battery is large. Accordingly, a high charge capacity can be obtained.

CITATION LIST

Patent Literature

PTL 1: Japanese Patent No. 3685109
PTL 2: Japanese Published Unexamined Patent Application No. 2007-287446

SUMMARY OF INVENTION

Technical Problem

However, when an oxide having the antifluorite structure is simply added as a positive electrode additive, a problem occurs in that a large amount of gas is generated during post-charging storage.

An object of the present invention is to provide a high-capacity nonaqueous electrolyte secondary battery in which generation of gas during post-charging storage can be suppressed.

Solution to Problem

A nonaqueous electrolyte secondary battery according to an aspect of the present invention includes: a positive electrode containing a positive electrode active material; a negative electrode; and a nonaqueous electrolyte. In the nonaqueous electrolyte secondary battery, the positive electrode contains the active material composed of a lithium transition metal oxide and a positive electrode additive composed of an oxide that contains Li and at least two elements other than Li and oxygen and has an antifluorite structure. The nonaqueous electrolyte secondary battery obtained is charged until the potential of the positive electrode is 4.0 V or higher and 4.65 V or lower (vs. Li/Li$^+$).

To extract an increased amount of lithium ions from an oxide having the antifluorite structure and used as the positive electrode additive to thereby obtain a higher charge capacity, it is necessary that the charging potential be 4.0 V (vs. Li/Li$^+$) or higher. The oxide having the antifluorite structure undergoes a decomposition reaction in a voltage range of 4.0 V (vs. Li/Li$^+$) or higher. In this case, oxygen gas is generated, but a large amount of lithium ions can be extracted. Since the oxide having the antifluorite structure has undergone a structural change due to the decomposition reaction, the oxide cannot accept lithium ions during discharging, so that an increase in discharge capacity is not achieved.

When the oxide having the antifluorite structure includes at least two substituent elements other than Li and oxygen, the amount of an inert phase unreactive with the electrolytic solution during post-charging storage increases. In this case, the reaction with the electrolytic solution is suppressed, and the generation of gas during post-charging storage can be suppressed.

Advantageous Effects of Invention

According to the present invention, a high-capacity nonaqueous electrolyte secondary battery in which the generation of gas during post-charging storage is suppressed can be provided.

DESCRIPTION OF EMBODIMENTS

Embodiments of the present invention will next be described. These embodiments are examples for embodying the present invention, and the present invention is not limited to these embodiments.

Figure 1:
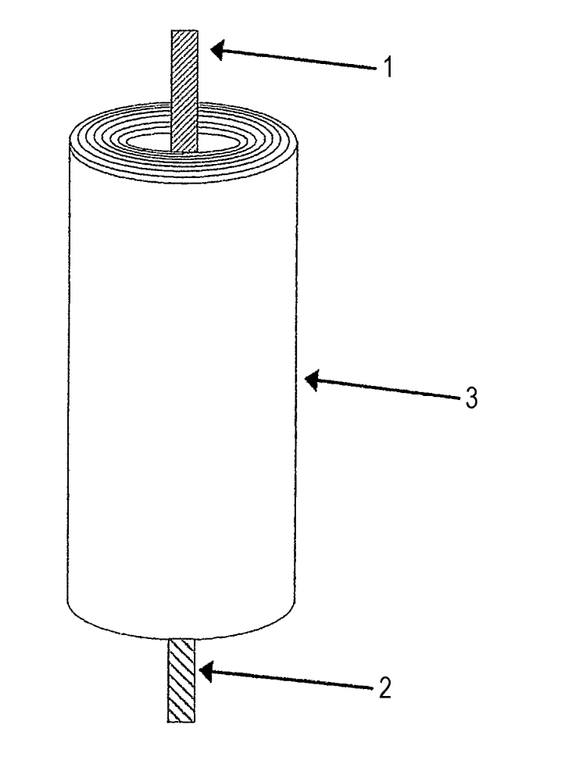
FIG. 1 is a perspective view of a test cell composed of a nonaqueous electrolyte secondary battery according to an embodiment.

FIG. 1 is a perspective view of a test cell composed of a nonaqueous electrolyte secondary battery according to an embodiment. The test cell shown in FIG. 1 includes a wound electrode assembly 3 including a positive electrode sheet and a negative electrode sheet, a positive electrode current collecting tab 1 connected to the positive electrode sheet, and a negative electrode current collecting tab 2 connected to the negative electrode sheet. The wound electrode assembly 3 includes the strip-shaped positive electrode sheet, the strip-shaped negative electrode sheet, and strip-shaped separators and is configured such that the positive electrode sheet and the negative electrode sheet are wound so as to be insulated from each other through the separators.

Examples of the positive electrode active material include: lithium-containing complex metal oxides; layered oxides such as lithium cobaltate ($LiCoO_2$), lithium nickel cobalt manganese oxide ($LiNiCoMnO_2$), and lithium nickel cobalt aluminum oxide ($LiNiCoAlO_2$); and spinel-type complex oxides such as lithium manganate ($LiMn_2O_4$). Preferred examples include layered oxides having a high volumetric energy density such as lithium cobaltate ($LiCoO_2$), lithium nickel cobalt manganese oxide ($LiNiCoMnO_2$), and lithium nickel cobalt aluminum oxide ($LiNiCoAlO_2$). Preferably, the average particle diameter of the positive electrode active material is, for example, within the range of from about 1 μm to about 100 μm inclusive.

The surface of the particles of the positive electrode active material may be coated with a metal oxide, a metal fluoride, a metal phosphate, etc., and it is particularly preferable that a rare earth element adheres to the surface of the particles. Preferably, the adhering rare earth element is, for example, at least one element selected from praseodymium, neodymium, erbium, samarium, europium, gadolinium, terbium, dysprosium, holmium, thulium, ytterbium, and lutetium. The adhering rare earth element is more preferably at least one element selected from praseodymium, neodymium, and erbium. Preferably, the adhering rare earth element is in the form of compound such as oxide or hydroxide.

When the amount of the oxide having the antifluorite structure and added as the positive electrode additive is increased, the charge capacity increases. However, at the same time, the discharge capacity decreases, and a reduction in initial efficiency occurs. If the amount of the positive electrode additive is increased, the irreversible capacity increases, and the effect of the addition cannot be obtained. With the positive electrode to which the above-described positive electrode additive is added, the effect of improving capacity is high for a battery system in which this positive electrode is combined with a negative electrode including, as a negative electrode active material, a Si-based material that provides a high capacity but causes a high irreversible capacity. However, if the amount of the positive electrode additive added is excessively large, the initial efficiency of the positive electrode itself may be lower than the initial efficiency of the negative electrode itself. Theoretically, when the amount of the positive electrode additive added is 10% by mass or more, the initial efficiency is 75% or less. Therefore, the content of the positive electrode additive is within the range of preferably from 0.1% by mass to 10% by mass inclusive and particularly preferably from 4% by mass to 10% by mass inclusive.

The positive electrode active material layer may further contain, in addition to the positive electrode active material and the positive electrode additive, a conductive agent, a binder, etc. Specific preferred examples of the conductive agent include carbon materials such as graphite and acetylene black, copper, nickel, iron, and alloys containing these metals. Preferably, the binder used has high oxidation resistance in order to suppress oxidative degradation due to released oxygen. It is preferable to use a binder with high alkali resistance in order to suppress gelation, and an additive for suppressing gelation may be added. Preferred specific examples of the binder include polyvinylidene fluoride. Specific examples of the additive for suppressing gelation include malonic acid, maleic acid, citraconic acid, acrylic acid, formic acid, citric acid, acetic acid, oxalic acid, lactic acid, pyruvic acid, propionic acid, and butyric acid.

No particular limitation is imposed on the thickness of a positive electrode current collector, and the thickness is preferably within the range of from about 1 μm to about 500 μm inclusive. The positive electrode current collector is formed of, for example, a well-known conductive material used for nonaqueous electrolyte secondary batteries such as lithium ion batteries and may be formed from, for example, a non-porous foil made of metallic Al or an Al alloy containing a metal such as Al. In the positive electrode, it is preferable to use a large amount of the conductive agent. The use of a large amount of the conductive agent allows the ability to collect current to increase, and the utilization ratio of the positive electrode additive is thereby improved. In addition, it is preferable to increase the filling density of the positive electrode.

The negative electrode includes a negative electrode current collector and a negative electrode active material layer disposed on the negative electrode current collector. Preferably, the negative electrode active material layer is disposed on opposite sides of the negative electrode current collector but may be disposed on one side of the negative electrode current collector.

The negative electrode current collector may be formed from a foil made of a metal such as Cu or an alloy containing a metal such as Cu. The thickness of the negative electrode current collector is preferably about 10 μm to about 30 μm.

The negative electrode active material used is, for example, a well-known negative electrode active material for nonaqueous electrolyte secondary batteries such as lithium ion batteries, and examples of the negative electrode active material include carbon-based active materials, alloy-based active materials, and mixtures of these carbon-based and alloy-based active materials. Examples of the carbon-based active materials include artificial graphite, natural graphite, non-graphitizable carbon, and graphitizable carbon. The alloy-based active material is alloyed with lithium during charging at a negative electrode potential to thereby absorb lithium and releases lithium during discharging, and examples of the alloy-based active material include silicon-based active materials containing silicon. Preferred examples of the silicon-based active materials include silicon, silicon compounds, partial substitution products thereof, and solid solutions thereof. Preferably, the silicon compound is, for example, silicon oxide represented by SiOa (0.05<a<1.95). From the viewpoint of increasing the charge-discharge capacity of the nonaqueous electrolyte secondary battery, the negative electrode active material layer contains preferably an alloy-based active material and more preferably silicon. The negative electrode active material layer may contain one type of negative electrode active material or may contain a plurality of types of negative electrode active materials.

Preferably, the average particle diameter of the negative electrode active material is within the range of, for example, from about 1 µm to about 100 µm inclusive. Preferably, the negative electrode active material layer further contains, in addition to the negative electrode active material, a binder, a conductive agent, etc. It is preferable that the binder used has high oxidation resistance in order to suppress oxidative degradation due to released oxygen. Specific examples of the binder used preferably include polyvinylidene fluoride.

Examples of the solvent for the nonaqueous electrolyte used in the present invention include cyclic carbonates, chain carbonates, esters, cyclic ethers, chain ethers, nitriles, and amides. Examples of the cyclic carbonates include ethylene carbonate, propylene carbonate, and butylene carbonate. Carbonates obtained by partially or fully substituting hydrogen in the above cyclic carbonates with fluorine may also be used. Examples of such carbonates include trifluoropropylene carbonate and fluoroethylene carbonate. Examples of the chain carbonates include dimethyl carbonate, ethyl methyl carbonate, diethyl carbonate, methyl propyl carbonate, ethyl propyl carbonate, and methyl isopropyl carbonate. Carbonates obtained by partially or fully substituting hydrogen in the above chain carbonates with fluorine may also be used. Examples of the esters include methyl acetate, ethyl acetate, propyl acetate, methyl propionate, ethyl propionate, and γ-butyrolactone. Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ethers. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl. Examples of the nitriles include acetonitrile, and examples of the amides include dimethylformamide. At least one selected from the above solvents may be used.

A lithium salt added to the nonaqueous solvent may be any lithium salt generally used as an electrolyte in conventional nonaqueous electrolyte secondary batteries. Examples of such a lithium salt include $LiPF_6$, $LiBF_4$, $LiAsF_6$, $LiClO_4$, $LiCF_3SO_3$, $LiN(FSO_2)_2$, $LiN(ClF21+(1SO_2)(C_mF_{2m}+1SO_2)$ (1 and m are each an integer of 1 or more), $LiC(C_pF_{2p}+1SO_2)(C_qF_{2p}+1SO_2)(C_qF_{2p}+1SO_2)(C_rF_{2r}+1SO_2)$ (p, q, and r are each an integer of 1 or more), $Li[B(C_2O_4)_2]$ (lithium bis(oxalate)borate (LiBOB)), $Li[B(C_2O_4)F_2]$, $Li[P(C_2O_4)F_4]$, and $Li[P(C_2O_4)_2F_2]$. One of these lithium salts may be used, or a combination of two or more may be used.

No particular limitation is imposed on the separators, so long as they can prevent a short circuit caused by the contact between the positive electrode and the negative electrode and can be impregnated with the nonaqueous electrolyte to provide lithium ion conductivity. The separators may be formed from, for example, a resin-made porous film. Specific examples of the resin-made porous film include polypropylene-made porous films, polyethylene-made porous films, and laminates of polypropylene-made and polyethylene-made porous films.

The structure of the battery is preferably a cylindrical battery structure because the structural pressure of the cylindrical battery improves the ability to collect current, so that the utilization ratio of the positive electrode additive is improved.

The present invention will next be described by way of Examples, but the present invention is not limited to these Examples.

EXPERIMENTAL EXAMPLE 1-1

[Production of Positive Electrode Active Material]

$Li_2CO_3$ serving as a Li source and an oxide represented by $Co_3O_4$ were mixed using an Ishikawa-type mixing-grinding mortar such that the molar ratio of Li to the transition metal element was 1:1, and the mixture was treated at 950° C. in an air atmosphere for 20 hours and then pulverized to thereby obtain $LiCoO_2$ having an average particle diameter of 16 µm. The prepared $LiCoO_2$ particles were added to pure water, and the mixture was stirred to thereby obtain a suspension with $LiCoO_2$ dispersed therein.

Next, an erbium nitrate pentahydrate $[Er(NO_3)_3.5H_2O]$ solution was added to the suspension. In this case, to adjust the pH of the solution with $LiCoO_2$ dispersed therein to 9, a 10% by mass aqueous nitric acid solution or a 10% by mass aqueous sodium hydroxide solution was appropriately added. After completion of the addition of the erbium nitrate pentahydrate solution, the resulting suspension was subjected to suction filtration. The powder obtained was washed with water and dried at 120° C., whereby $LiCoO_2$ powder with an erbium hydroxide compound adhering to part of its surface was obtained. Then the obtained powder was subjected to heat treatment in air at 300° C. for 5 hours. As a result of the heat treatment at 300° C. as described above, all or most of the erbium hydroxide changed to erbium oxyhydroxide. In this state, the erbium oxyhydroxide adhered to part of the surface of the positive electrode active material particles. However, part of the erbium hydroxide may remain unchanged, so that the erbium hydroxide may adhere to part of the surface of the positive electrode active material particles. The obtained positive electrode active material was observed under a scanning electron microscope (SEM). It was found that an erbium compound having an average particle diameter of 100 nm or less adhered to part of the surface of the positive electrode active material. The amount of the adhering erbium compound in terms of elemental erbium was measured by ICP and found to be 0.06% by mass with respect to $LiCoO_2$. The BET value of the obtained positive electrode active material was measured and found to be 0.60 $m^2/g$.

[Production of Li-Containing Compound Used as Positive Electrode Additive]

$Li_2O$ serving as a Li source, an oxide represented by $Fe_2O_3$, and $Al(OH)_3$ were mixed using an Ishikawa-type mixing-grinding mortar such that the molar ratio of Li, Fe, and Al was 5:0.9:0.1, and the mixture was heat-treated at 800° C. in an air atmosphere for 20 hours and then pulverized to thereby obtain $Li_5Fe_{0.9}Al_{0.1}O_4$ having an average particle diameter of about 10 µm.

[Production of Positive Electrode]

The above-produced positive electrode active material and the above-produced positive electrode additive were mixed at a mass ratio of 96:4 to obtain an active material mixture. Then the active material mixture, carbon powder used as a positive electrode conductive agent, polyvinylidene fluoride used as a binder, and N-methyl-2-pyrrolidone used as a dispersion medium were added such that the mass ratio of the active material mixture, the positive electrode conductive agent, and the binder was 95:2.5:2.5 and then kneaded to thereby prepare a positive electrode slurry. This positive electrode slurry was applied to a 15 μm-thick aluminum foil and dried to produce a positive electrode mixture layer on the aluminum foil. Then the positive electrode mixture layer was rolled between rollers, and a positive electrode current collecting tab was attached, whereby a positive electrode was produced. The positive electrode additive may react with water in air and is thereby decomposed. Therefore, the positive electrode was produced in a dry atmosphere with a dew point of −30° C.

[Production of Negative Electrode]

Graphite serving as the negative electrode active material and polyvinylidene fluoride used as the binder were added at a mass ratio of 95:5 and kneaded to prepare a negative electrode slurry. The negative electrode slurry was applied to a 10 μm-thick copper foil and dried to produce a negative electrode mixture layer on the copper foil. Then the negative electrode mixture layer was rolled between rollers, and a negative electrode current collecting tab was attached, whereby a negative electrode was produced.

[Preparation of Nonaqueous Electrolyte]

Lithium hexafluorophosphate (LiPF$_6$) was dissolved in a solvent mixture of ethylene carbonate (EC), ethyl methyl carbonate (EMC), and diethyl carbonate (DEC) at a volume ratio of 3:6:1 such that the concentration of the lithium hexafluorophosphate was 1.0 mol/L. Then vinylene carbonate (VC) was added at a ratio of 2% by mass to prepare a nonaqueous electrolytic solution.

[Production of Test Cell]

Next, the evaluation of the nonaqueous electrolyte secondary battery using a test cell will be described. As shown in FIG. 1, the test cell includes: a wound electrode assembly produced by spirally winding the positive electrode and the negative electrode with polyolefin-made fine porous separators disposed therebetween; and an aluminum laminated film used as an exterior member. The wound electrode assembly is filled with the nonaqueous electrolytic solution. The dimensions of the negative electrode are such that it can face the positive electrode. The theoretical capacity of the above-produced test cell is 100 mAh.

EXPERIMENTAL EXAMPLE 1-2

A nonaqueous electrolyte secondary battery was produced in the same manner as in Experimental Example 1-1 except that, when the Li-containing compound used as the positive electrode additive was produced, Li$_2$O, Fe$_2$O$_3$, and Al(OH)$_3$ were used instead of the positive electrode materials in Experimental Example 1-1 and mixed such that the stoichiometric ratio of Li$_5$Fe$_{0.8}$Al$_{0.2}$O$_4$ was satisfied.

EXPERIMENTAL EXAMPLE 1-3

A nonaqueous electrolyte secondary battery was produced in the same manner as in Experimental Example 1-1 except that, when the Li-containing compound used as the positive electrode additive was produced, Li$_2$O, Fe$_2$O$_3$, and Ga$_2$O$_3$ were used instead of the positive electrode materials in Experimental Example 1-1 and mixed such that the stoichiometric ratio of Li$_5$Fe$_{0.9}$Ga$_{0.1}$O$_4$ was satisfied.

EXPERIMENTAL EXAMPLE 1-4

A nonaqueous electrolyte secondary battery was produced in the same manner as in Experimental Example 1-1 except that, when the Li-containing compound used as the positive electrode additive was produced, Li$_2$O, Fe$_2$O$_3$, and Ga$_2$O$_3$ were used instead of the positive electrode materials in Experimental Example 1-1 and mixed such that the stoichiometric ratio of Li$_5$Fe$_{0.7}$Ga$_{0.3}$O$_4$ was satisfied.

EXPERIMENTAL EXAMPLE 1-5

A nonaqueous electrolyte secondary battery was produced in the same manner as in Experimental Example 1-1 except that, when the Li-containing compound used as the positive electrode additive was produced, Li$_2$O, Fe$_2$O$_3$, CeO$_2$, and ZrO$_2$ were used instead of the positive electrode materials in Experimental Example 1-1 and mixed such that the stoichiometric ratio of Li$_5$Fe$_{0.99}$Ce$_{0.008}$Zr$_{0.002}$O$_4$ was satisfied.

EXPERIMENTAL EXAMPLE 1-6

A nonaqueous electrolyte secondary battery was produced in the same manner as in Experimental Example 1-1 except that, when the Li-containing compound used as the positive electrode additive was produced, Li$_2$O, Fe$_2$O$_3$, CeO$_2$, and ZrO$_2$ were used instead of the positive electrode materials in Experimental Example 1-1 and mixed such that the stoichiometric ratio of Li$_5$Fe$_{0.9}$Ce$_{0.08}$Zr$_{0.02}$O$_4$ was satisfied.

EXPERIMENTAL EXAMPLE 1-7

A nonaqueous electrolyte secondary battery was produced in the same manner as in Experimental Example 1-1 except that, when the Li-containing compound used as the positive electrode additive was produced, Li$_2$O, Fe$_2$O$_3$, Y$_2$O$_3$, and Mn$_2$O$_3$ were used instead of the positive electrode materials in Experimental Example 1-1 and mixed such that the stoichiometric ratio of Li$_5$Fe$_{0.99}$Y$_{0.008}$Mn$_{0.002}$O$_4$ was satisfied.

EXPERIMENTAL EXAMPLE 1-8

A nonaqueous electrolyte secondary battery was produced in the same manner as in Experimental Example 1-1 except that, when the Li-containing compound used as the positive electrode additive was produced, Li$_2$O, Fe$_2$O$_3$, Y$_2$O$_3$, and Mn$_2$O$_3$ were used instead of the positive electrode materials in Experimental Example 1-1 and mixed such that the stoichiometric ratio of Li$_5$Fe$_{0.9}$Y$_{0.08}$Mn$_{0.02}$O$_4$ was satisfied.

EXPERIMENTAL EXAMPLE 1-9

A nonaqueous electrolyte secondary battery was produced in the same manner as in Experimental Example 1-1 except that, when the Li-containing compound used as the positive electrode additive was produced, Li$_2$O, CoO, and ZnO were used instead of the positive electrode materials in Experimental Example 1-1 and mixed such that the stoichiometric ratio of Li$_6$Co$_{0.9}$Zn$_{0.1}$O$_4$ was satisfied.

EXPERIMENTAL EXAMPLE 1-10

A nonaqueous electrolyte secondary battery was produced in the same manner as in Experimental Example 1-1 except that, when the Li-containing compound used as the positive electrode additive was produced, $Li_2O$, CoO, and ZnO were used instead of the positive electrode materials in Experimental Example 1-1 and mixed such that the stoichiometric ratio of $Li_6Co_{0.7}Zn_{0.3}O_4$ was satisfied.

EXPERIMENTAL EXAMPLE 1-11

A nonaqueous electrolyte secondary battery was produced in the same manner as in Experimental Example 1-1 except that, when the Li-containing compound used as the positive electrode additive was produced, $Li_2O$, CoO, and $Al(OH)_3$ were used instead of the positive electrode materials in Experimental Example 1-1 and mixed such that the stoichiometric ratio of $Li_6Co_{0.9}Al_{0.1}O_4$ was satisfied.

EXPERIMENTAL EXAMPLE 1-12

A nonaqueous electrolyte secondary battery was produced in the same manner as in Experimental Example 1-1 except that, when the Li-containing compound used as the positive electrode additive was produced, $Li_2O$, CoO, and $Al(OH)_3$ were used instead of the positive electrode materials in Experimental Example 1-1 and mixed such that the stoichiometric ratio of $Li_6Co_{0.7}Al_{0.3}O_4$ was satisfied.

COMPARATIVE EXAMPLE 1

A nonaqueous electrolyte secondary battery was produced in the same manner as in Experimental Example 1-1 except that a positive electrode mixture was produced using only the positive electrode active material without the addition of any positive electrode additive.

COMPARATIVE EXAMPLE 2

A nonaqueous electrolyte secondary battery was produced in the same manner as in Experimental Example 1-1 except that, when the Li-containing compound used as the positive electrode additive was produced, $Li_2O$ and $Fe_2O_3$ were used instead of the positive electrode materials in Experimental Example 1-1 and mixed such that the stoichiometric ratio of $Li_5FeO_4$ was satisfied.

[Charge-Discharge Test]

Each of the test cells produced in Experimental Examples 1-1 to 1-12 and Comparative Examples 1 and 2 was charged at a constant current of 0.15 It (=15 mA) until the potential of the positive electrode reached 4.40 V with respect to the graphite and then charged at a constant voltage of 4.40 V until the current reached 1/50 It (=2 mA). Next, each test cell was discharged at a constant current of 0.10 It (=10 mA) until the voltage of the cell reached 2.50 V, and the quantity of electricity flowing during the discharging was measured to determine initial discharge capacity (mAh/g).

[Post-Charging Storage Test]

After the charge-discharge test, each test cell was charged at a constant current of 0.15 It (=15 mA) until the potential of the positive electrode reached 4.40 V with respect to the graphite and then charged at a constant voltage of 4.40 V until the current reached 1/50 It (=2 mA). Then each cell was placed in a high-temperature bath at 60° C. for 24 hours to perform a post-charging storage test.

[Measurement of Swelling Due to Gas]

After the post-charging storage, each cell was suspended from an electronic balance and fully immersed in water, and the weight of the cell was measured with buoyant force exerted on the cell. When the amount of gas generated in the cell is large, the volume of the cell increases, so that its weight decreases due to the influence of the buoyant force. The weight was measured before and after the post-charging storage, and the rate of generation of gas during the post-charging storage was determined from the difference in weight using the following formula. The results are shown in Table 1.

Rate of generation of gas (%)=difference in weight of cell before and after post-charging storage/difference in weight of cell in Comparative 1 before and after post-charging storage×100

TABLE 1

| | Positive electrode | Positive electrode additive | Mixing ratio | Initial charge capacity | Initial discharge capacity | Rate of generation of gas |
|---|---|---|---|---|---|---|
| Experimental Example 1-1 | $LiCoO_2$ | $Li_5Fe_{0.9}Al_{0.1}O_4$ | 4% by mass | 209 mAh/g | 165 mAh/g | 89% |
| Experimental Example 1-2 | $LiCoO_2$ | $Li_5Fe_{0.9}Al_{0.2}O_4$ | 4% by mass | 203 mAh/g | 167 mAh/g | 64% |
| Experimental Example 1-3 | $LiCoO_2$ | $Li_5Fe_{0.9}Ga_{0.1}O_4$ | 4% by mass | 192 mAh/g | 162 mAh/g | 78% |
| Experimental Example 1-4 | $LiCoO_2$ | $Li_5Fe_{0.7}Ga_{0.3}O_4$ | 4% by mass | 186 mAh/g | 161 mAh/g | 44% |
| Experimental Example 1-5 | $LiCoO_2$ | $Li_5Fe_{0.99}Ce_{0.008}Zr_{0.002}O_4$ | 4% by mass | 209 mAh/g | 167 mAh/g | 79% |
| Experimental Example 1-6 | $LiCoO_2$ | $Li_5Fe_{0.9}Ce_{0.08}Zr_{0.02}O_4$ | 4% by mass | 198 mAh/g | 164 mAh/g | 66% |
| Experimental Example 1-7 | $LiCoO_2$ | $Li_5Fe_{0.99}Y_{0.008}Mn_{0.002}O_4$ | 4% by mass | 211 mAh/g | 166 mAh/g | 85% |
| Experimental Example 1-8 | $LiCoO_2$ | $Li_5Fe_{0.9}Y_{0.08}Mn_{0.02}O_4$ | 4% by mass | 205 mAh/g | 168 mAh/g | 71% |
| Experimental Example 1-9 | $LiCoO_2$ | $Li_6Co_{0.9}Zn_{0.1}O_4$ | 4% by mass | 219 mAh/g | 172 mAh/g | 95% |
| Experimental Example 1-10 | $LiCoO_2$ | $Li_6Co_{0.7}Zn_{0.3}O_4$ | 4% by mass | 214 mAh/g | 168 mAh/g | 83% |
| Experimental Example 1-11 | $LiCoO_2$ | $Li_6Co_{0.9}Al_{0.1}O_4$ | 4% by mass | 217 mAh/g | 171 mAh/g | 72% |
| Experimental Example 1-12 | $LiCoO_2$ | $Li_6Co_{0.7}Al_{0.3}O_4$ | 4% by mass | 211 mAh/g | 165 mAh/g | 68% |
| Comparative Example 1 | $LiCoO_2$ | — | 0% | 186 mAh/g | 162 mAh/g | 21% |
| Comparative Example 2 | $LiCoO_2$ | $Li_5FeO_4$ | 4% by mass | 210 mAh/g | 166 mAh/g | 100% |

As can be seen from the results in Table 1, the comparison of Experimental Examples 1-1 to 1-12 with Comparative Example 1 shows that, when a positive electrode additive having the antifluorite structure is added, the initial charge capacity can be higher than that when no additive is added, while the initial discharge capacity is maintained. It can be seen, by comparing Comparative Example 2 with Experimental Examples 1-1 to 1-12, that the generation of gas can be suppressed when the oxide having the antifluorite structure contains at least two additional elements other than Li and oxygen. Particularly, in Experimental Examples 1-1, 1-2, 1-11, and 1-12 in which the at least two additional elements added include Al, the charge capacity is large, and the generation of gas is suppressed. Therefore, the addition of Al is particularly preferred.

The reason for the above may be as follows. When a positive electrode additive composed of an oxide containing at least two elements in addition to Li and oxygen and having the antifluorite structure is added to the positive electrode mixture, decomposition of the nonaqueous electrolytic solution is suppressed because the internal structure of the positive electrode additive is stabilized, so that the generation of gas during post-charging storage is suppressed. By increasing the amount of substitution with Al, Ga, Zn, etc. with respect to Fe or Co, the effect of suppressing the generation of gas during post-charging storage is further increased.

EXPERIMENTAL EXAMPLE 2-1

In this Experimental Example, a preferable average particle diameter of a positive electrode additive composed of an oxide having the antifluorite structure will be mainly examined. $Li_2O$ serving as a Li source, an oxide represented by $Fe_2O_3$, and $H_2SO_4$ were mixed using an Ishikawa-type mixing-grinding mortar such that the molar ratio of Li, Fe, and S was 5:0.9986:0.0014, and the mixture was heat-treated at 800° C. in an inert atmosphere for 20 hours and then pulverized to thereby obtain $Li_5Fe_{0.9986}S_{0.0014}O_4$ having an average particle diameter of 10 μm.

The $Li_5Fe_{0.9986}S_{0.0014}O_4$ in Experimental Example 2-1 above and having an average particle diameter of 10 μm was used to produce the following test cell. The test cell includes a measurement electrode unit, a reference electrode, and an aluminum laminated film used as an exterior member. The measurement electrode unit was produced by spirally winding a positive electrode including the $Li_5Fe_{0.9986}S_{0.0014}O_4$ having an average particle diameter of 10 μm and metallic lithium used as the reference electrode with microporous polyolefin-made film separators therebetween. The measurement electrode unit was filled with a nonaqueous electrolytic solution.

EXPERIMENTAL EXAMPLE 2-2

A test cell was produced in the same manner as in Experimental Example 2-1 except that the pulverization conditions in Experimental Example 2-1 were changed such that the average particle diameter was 30 μm.

EXPERIMENTAL EXAMPLE 2-3

A test cell was produced in the same manner as in Experimental Example 2-1 except that the pulverization conditions in Experimental Example 2-1 were changed such that the average particle diameter was 0.1 μm.

[Charge-Discharge Test]

Each of the test cells produced in Experimental Examples 2-1 to 2-3 was charged at a constant current of 0.05 It (=5 mA) until the potential of the positive electrode reached 4.60 V with respect to the lithium and then charged at a constant voltage of 4.60 V until the current reached 1/1,000 It (=0.1 mA). Next, each test cell was discharged at a constant current of 0.05 It (=5 mA) until the voltage of the cell reached 2.10 V, and the quantity of electricity flowing during the discharging was measured to determine initial discharge capacity (mAh/g). The results are shown in Table 2 below.

TABLE 2

| | Positive electrode material | Particle diameter | Intial discharge capacity |
|---|---|---|---|
| Experimental Example 2-1 | $Li_5Fe_{0.9986}S_{0.0014}O_4$ | 10 μm | 813 mAh/g |
| Experimental Example 2-2 | $Li_5Fe_{0.9986}S_{0.0014}O_4$ | 30 μm | 297 mAh/g |
| Experimental Example 2-3 | $Li_5Fe_{0.9986}S_{0.0014}O_4$ | 0.1 μm | 677 mAh/g |

As can be seen from the results in Table 2, with the $Li_5Fe_{0.9986}S_{0.0014}O_4$ having an average particle diameter of 30 μm, the initial discharge capacity is reduced significantly. With the $Li_5Fe_{0.9986}S_{0.0014}O_4$ having an average particle diameter of 10 μm, the initial discharge capacity is higher than that with the $Li_5Fe_{0.9986}S_{0.0014}O_4$ having an average particle diameter of 0.1 μm. As can be seen from the above experimental results, the particle diameter of the positive electrode additive composed of the oxide having the antifluorite structure is particularly preferably within the range of from 0.1 μm to 10 m inclusive.

EXPERIMENTAL EXAMPLE 3

The positive electrode additive composed of the oxide having the antifluorite structure and produced in Experimental Example 2-1, i.e., $Li_5Fe_{0.9986}S_{0.0014}O_4$ having an average particle diameter of 10 μm, and lithium cobaltate used as the positive electrode active material were mixed at mixing ratios of 0%, 0.1%, 4%, 8%, 10%, 15%, 20%, and 30%. For each case, the initial charge capacity, the initial discharge capacity, and the initial efficiency were determined. The results are shown in Table 3. The mixing ratio is the value of the ratio positive electrode additive/(positive electrode active material+positive electrode additive)×100, and the initial efficiency is the value of the ratio initial discharge capacity/initial charge capacity×100.

REFERENCE EXPERIMENTAL EXAMPLE 1

For reference, the initial charge capacity and initial discharge capacity of $LiCoO_2$ were measured in the same manner as in Experimental Example 2-1 above. The differences from Experimental Example 2-1 are that the positive electrode material was changed from $Li_5Fe_{0.9986}S_{0.0014}O_4$ to $LiCoO_2$ and that, in the charge-discharge test, the cell was charged until the potential with respect to the lithium reached 4.50 V and discharged until the potential with respect to the lithium reached 2.50 V. The measurement conditions for Reference Experimental Example 1 are also shown in Tables 3 and 4 below.

TABLE 3

|  | Initial charge capacity | Initial discharge capacity | Initial efficiency |
|---|---|---|---|
| $Li_5Fe_{0.9986}S_{0.0014}O_4$ | 813 mAh/g | 10 mAh/g | 1.20% |
| $LiCoO_2$ | 194.3 mAh/g | 185.5 mAh/g | 95.50% |
| Mixing ratio | | | |
| 0% | 194.3 mAh/g | 185.5 mAh/g | 95.50% |
| 0.10% | 194.9 mAh/g | 185.3 mAh/g | 95.10% |
| 4% | 219 mAh/g | 178.5 mAh/g | 81.50% |
| 8% | 243.8 mAh/g | 171.5 mAh/g | 70.30% |
| 10% | 256.2 mAh/g | 168 mAh/g | 65.60% |
| 15% | 287.1 mAh/g | 159.2 mAh/g | 55.40% |
| 20% | 318 mAh/g | 150.4 mAh/g | 47.30% |
| 30% | 379.9 mAh/g | 132.9 mAh/g | 35.00% |

EXPERIMENTAL EXAMPLE 4

The positive electrode additive composed of the oxide having the antifluorite structure and produced in Experimental Example 2-2, i.e., $Li_5Fe_{0.9986}S_{0.0014}O_4$ having an average particle diameter of 10 μm, and lithium cobaltate used as the positive electrode active material were mixed at mixing ratios of 0%, 0.1%, 4%, 8%, 10%, 15%, 20%, and 30%. For each case, the initial charge capacity (mAh/g), the initial discharge capacity (mAh/g), and the initial efficiency (%) were determined. The results are shown in Table 4 below. The mixing ratio is the value of the ratio positive electrode additive/(positive electrode active material+positive electrode additive)×100, and the initial efficiency is the value of the ratio initial discharge capacity/initial charge capacity×100.

TABLE 4

|  | Initial charge capacity | Initial discharge capacity | Initial efficiency |
|---|---|---|---|
| $Li_5Fe_{0.9986}S_{0.0014}O_4$ | 677 mAh/g | 10 mAh/g | 1.50% |
| $LiCoO_2$ | 194.3 mAh/g | 185.5 mAh/g | 95.50% |
| Mixing ratio | | | |
| 0% | 194.3 mAh/g | 185.5 mAh/g | 95.50% |
| 0.10% | 194.8 mAh/g | 185.3 mAh/g | 95.10% |
| 4% | 213.6 mAh/g | 178.5 mAh/g | 83.60% |
| 8% | 232.9 mAh/g | 171.5 mAh/g | 73.60% |
| 10% | 242.6 mAh/g | 168 mAh/g | 69.20% |
| 15% | 266.7 mAh/g | 159.2 mAh/g | 59.70% |
| 20% | 290.8 mAh/g | 150.4 mAh/g | 51.70% |
| 30% | 339.1 mAh/g | 132.9 mAh/g | 39.20% |

As can be seen from the results in Tables 3 and 4 above, when the amount of $Li_5Fe_{0.9986}S_{0.0014}O_4$ added, which is the positive electrode additive composed of the oxide having the antifluorite structure, increases, the charge capacity increases. However, at the same time, the discharge capacity decreases, and a reduction in initial efficiency occurs.

Therefore, the content of the positive electrode additive is preferably within that range of from 0.1% by mass to 10% by mass inclusive and particularly preferably from 4% by mass to 10% by mass inclusive. By matching the negative electrode initial efficiency with the positive electrode initial efficiency, a battery with reduced irreversible capacity can be produced.

REFERENCE EXPERIMENTAL EXAMPLE 2

A test cell was produced in the same manner as in Experimental Example 2-1 above except that SiO was used as the negative electrode active material instead of the positive electrode additive composed of the oxide produced in Experimental Example 2-1 and having the antifluorite structure. The test cell was charged at a constant current of 0.07 It (=7 mA) until the potential of the negative electrode reached 0 V with respect to the lithium. Next, the test cell was discharged at a constant current of 0.07 It (=7 mA) until the voltage of the cell reached 1.00 V. The quantity of electricity flowing during the discharging was measured, and the initial charge capacity (mAh/g) and the initial discharge capacity (mAh/g) were determined. The results are shown in Table 5. The initial efficiency is the value of the ratio initial discharge capacity/initial charge capacity×100.

REFERENCE EXPERIMENTAL EXAMPLE 3

A test cell was produced in the same manner as in Experimental Example 2-1 above except that graphite was used as the negative electrode active material instead of the positive electrode additive composed of the oxide produced in Experimental Example 2-1 and having the antifluorite structure. The test cell was charged at a constant current of 0.07 It (=7 mA) until the potential of the negative electrode reached 0 V with respect to the lithium. Next, the test cell was discharged at a constant current of 0.07 It (=7 mA) until the voltage of the cell reached 1.00 V. The quantity of electricity flowing during the discharging was measured, and the initial charge capacity (mAh/g) and the initial discharge capacity (mAh/g) were determined. The results are shown in Table 5. The initial efficiency is the value of the ratio initial discharge capacity/initial charge capacity×100.

REFERENCE EXPERIMENTAL EXAMPLE 4

The SiO used as the negative electrode active material in Reference Experimental Example 2 and the graphite used as the negative electrode active material in the above Reference Experimental Example were mixed at mixing ratios of 0%, 5%, 10%, 15%, 20%, 25%, 30%, 35%, 40%, 45%, and 50%. For each case, the initial charge capacity (mAh/g), the initial discharge capacity (mAh/g), and the initial efficiency (%) were determined. The results are shown in Table 5. The mixing ratio is the value of the ratio SiO/(graphite+SiO)×100, and the initial efficiency is the value of the ratio initial discharge capacity/initial charge capacity×100.

TABLE 5

|  | Initial charge capacity | Initial discharge capacity | Initial efficiency |
|---|---|---|---|
| C | 370 mAh/g | 356 mAh/g | 96.20% |
| SiO | 2087 mAh/g | 1453 mAh/g | 69.60% |
| Mixing ratio | | | |
| 0% | 370 mAh/g | 356 mAh/g | 96.20% |
| 5% | 455.9 mAh/g | 410.9 mAh/g | 90.10% |
| 10% | 541.7 mAh/g | 465.7 mAh/g | 86.00% |
| 15% | 627.6 mAh/g | 520.6 mAh/g | 82.90% |
| 20% | 713.4 mAh/g | 575.4 mAh/g | 80.70% |
| 25% | 799.3 mAh/g | 630.3 mAh/g | 78.90% |
| 30% | 885.1 mAh/g | 685.1 mAh/g | 77.40% |
| 35% | 971 mAh/g | 740 mAh/g | 76.20% |
| 40% | 1057 mAh/g | 794.8 mAh/g | 75.20% |
| 45% | 1143 mAh/g | 849.7 mAh/g | 74.40% |
| 50% | 1229 mAh/g | 904.5 mAh/g | 73.60% |

As can be seen from Table 5, as the amount of SiO mixed increases, the initial efficiency decreases. When the amount of SiO mixed is adjusted such that the initial efficiency is comparable to that of the positive electrode, a battery with high efficiency can be produced.

REFERENCE SIGNS LIST

1: positive electrode current collecting tab, 2: negative electrode current collecting tab, 3: electrode assembly.

The invention claimed is:

1. A nonaqueous electrolyte secondary battery comprising: a positive electrode containing a positive electrode active material; a negative electrode; and a nonaqueous electrolyte; wherein the positive electrode contains the active material composed of a lithium transition metal oxide and a positive electrode additive composed of an oxide that contains Li and at least two elements other than Li and oxygen and has an antifluorite structure, wherein the oxide having the antifluorite structure is represented by general formula $Li_xA_yB_zO_4$ (x=4 to 7, y=0.5 to 1.5, z=0.01 to 1.5, A is at least one metal selected from Co and Fe, and B is at least one metal selected from Ce, Y and S.

2. The nonaqueous electrolyte secondary battery according to claim 1, wherein a rare earth element adheres to the surface of the positive electrode active material.

3. The nonaqueous electrolyte secondary battery according to claim 1, wherein, in a positive electrode active material layer, the mixing ratio of the positive electrode additive composed of the oxide containing Li and at least two elements other than Li and oxygen and having the antifluorite structure to the positive electrode active material is within the range of from 0.1% by mass to 10% by mass inclusive.

4. The nonaqueous electrolyte secondary battery according to claim 1, wherein the positive electrode additive has a particle diameter of from 0.1µm to 10µm inclusive.

5. The nonaqueous electrolyte secondary battery according to claim 1, wherein the negative electrode contains a graphite material and/or a silicon compound that can absorb and release Li.

6. The nonaqueous electrolyte secondary battery according to claim 1, wherein the general formula B includes at least Ce.

7. The nonaqueous electrolyte secondary battery according to claim 1, wherein the general formula B includes at least Y.

8. The nonaqueous electrolyte secondary battery according to claim 1, wherein the general formula B includes at least S.

* * * * *